United States Patent [19]

Kempter et al.

[11] 4,310,645

[45] Jan. 12, 1982

[54] POLYADDUCTS OF AMMONIA AND EPOXIDE COMPOUNDS, PROCESSES FOR THEIR MODIFICATION, AND THEIR USE

[75] Inventors: Fritz E. Kempter, Mannheim; Eberhard Schupp, Schwetzingen; Hans-Uwe Schenck, Wachenheim; Erich Gulbins, Heidelberg-Neuenheim, all of Fed. Rep. of Germany

[73] Assignee: BASF Aktiengesellschaft, Fed. Rep. of Germany

[21] Appl. No.: 213,174

[22] Filed: Dec. 4, 1980

Related U.S. Application Data

[62] Division of Ser. No. 137,748, Apr. 7, 1980.

[30] Foreign Application Priority Data

Apr. 9, 1979 [DE] Fed. Rep. of Germany ....... 2914297

[51] Int. Cl.$^3$ .............................................. C08G 59/40
[52] U.S. Cl. ....................... 525/526; 525/523; 525/528; 528/45; 528/103; 528/104; 528/107; 528/162; 528/250; 528/254; 528/407; 204/181 C; 428/375
[58] Field of Search ....................... 525/523, 526, 528; 528/107, 162, 250, 254, 45, 104, 407

[56] References Cited

U.S. PATENT DOCUMENTS

| | | | |
|---|---|---|---|
| 3,312,664 | 4/1967 | Bremmer | 260/47 |
| 3,365,471 | 1/1968 | Becke et al. | 260/348 |
| 3,391,097 | 7/1968 | Williamson | 260/18 |
| 3,450,711 | 6/1969 | Megna et al. | 260/326 |
| 3,716,402 | 2/1973 | Hicks | 427/386 |
| 3,922,253 | 11/1975 | Jerabek et al. | 528/45 |
| 4,031,050 | 6/1977 | Jerabek et al. | 528/45 X |
| 4,137,213 | 1/1979 | Kempter et al. | 260/39 P |
| 4,163,815 | 8/1979 | Cheung | 427/385 |

FOREIGN PATENT DOCUMENTS 1088496 10/1967 United Kingdom .
1221906 2/1971 United Kingdom .

*Primary Examiner*—Earl A. Nielsen

*Attorney, Agent, or Firm*—Keil & Witherspoon

[57] ABSTRACT

Polyadducts, free from epoxide groups, are obtained from ammonia and epoxide compounds by reacting 1 mole of ammonia with from 1.2 to 2.0 equivalents of epoxide, so that if diepoxide compounds are used products of the general formula (I)

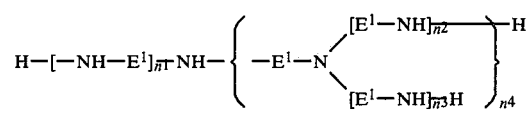

are obtained, while if triepoxides and/or tetraepoxide compounds are used, by themselves, or together with diepoxide compounds, products of the general formula II

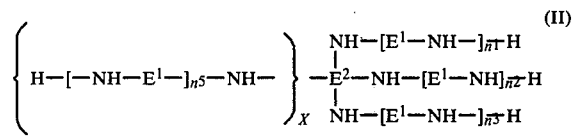

are produced; in these formulae, the $E^1$'s are identical or different hydroxyl-containing divalent radicals and the $E^2$'s are identical or different hydroxyl-containing trivalent or tetravalent radicals, resulting from the opening of the oxirane rings of epoxide compounds containing two, three or four epoxide groups in the molecule, $n^1$, $n^3$ and $n^5$ are from 0 to 3, $n^2$ and $n^4$ are from 1 to 3 and X is 0 or 1, and one or more of the divalent radicals $E^1$ in the general formula (II) may or may not be replaced by polyvalent radicals $E^2$.

The novel polyadducts can be modified by reaction with aldehydes, ketones, monoepoxide compounds, carboxylic acids, carboxylic acid esters or isocyanates, or by protonation with an acid, and may be used, for example, for the cathodic electrocoating of metallic articles.

4 Claims, No Drawings

POLYADDUCTS OF AMMONIA AND EPOXIDE COMPOUNDS, PROCESSES FOR THEIR MODIFICATION, AND THEIR USE

This is a division of application Ser. No. 137,748, filed Apr. 7, 1980.

The present invention relates to polyadducts of ammonia and epoxide compounds and their use for the preparation of coating agents, especially their use, in a protonized form, as binders for the cathodic electrocoating of metallic articles.

Surface-coating agents for cathodic electrocoating, based on reaction products of polyepoxides or diepoxides with primary and/or secondary amines, have long been known and are employed, after having been subjected to very diverse modification processes, for the production of cathodic electrocoating finishes.

In contrast to the reaction of diepoxides or polyepoxides with primary or secondary amines, the reaction with ammonia has hitherto not been disclosed in the context of electrocoating binders.

Regarding the reaction between polyepoxides and ammonia per se, there is also very little information in the literature.

German Laid-Open Application DOS No. 1,495,537, for example, describes the reaction of epoxides with ammonia in the presence of emulsifiers and/or protective colloids.

Japanese Pat. No. 026,341 concerns the reaction of epoxides with aqueous ammonia in acetone solution, to give 1,4-bis-(2-hydroxy-3-aminopropoxy)-benzene, of melting point 128°–132° C.

Di-primary amino compounds, of the following formula

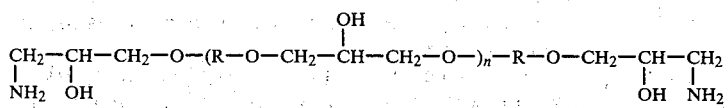

are obtained by the method of U.S. Pat. No. 1,947,879. According to this Patent, the products are intended to be used as epoxy resin hardeners.

In all these cases, the products contain exclusively primary amino groups.

Such products are obtained if the reaction of diepoxides is carried out with a very large excess of ammonia. For example, U.S. Pat. No. 1,947,879, referred to above, mentions an excess of from 25 to 50 moles of $NH_3$ per epoxide group.

U.S. Pat. No. 3,716,402 describes reaction products of epoxy resins with primary amines. It is true that ammonia is also mentioned as a primary amine, but this Patent prescribes the use of 1 equivalent of epoxide per mole of amine, leading to crosslinking of the batch if ammonia is used as the amine.

It is an object of the present invention to provide novel polyadducts which can be prepared from simple starting materials and can be advantageously converted to products possessing diverse uses and valuable properties.

We have found, surprisingly, that this object is achieved by reacting polyepoxides or diepoxides with relatively small amounts of ammonia, and that this reaction gives nitrogen-containing oligomers or polymers of low molecular weight, which can be employed either directly as a cathodic coating binder or as starting materials for the preparation of such binders.

Accordingly, the present invention relates to polyadducts of ammonia and epoxide compounds, which consist of epoxide-free reaction products of ammonia and diepoxides, triepoxides and/or tetraepoxides, from 1.75 to 10 moles of ammonia having been employed per epoxide group and 1 mole of ammonia having been reacted with from 1.2 to 2.0 equivalents of epoxide, so that if diepoxide compounds are used products of the general formula (I)

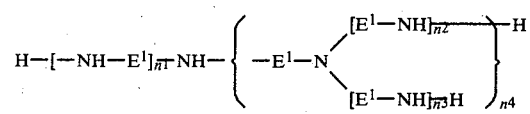

are obtained, whilst if triepoxides and/or tetraepoxide compounds are used, by themselves, or together with diepoxide compounds, products of the general formula II

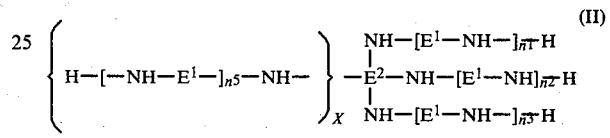

are produced; in these formulae, the $E^1$'s are identical or different hydroxyl-containing divalent radicals and the $E^2$'s are identical or different hydroxyl-containing trivalent or tetravalent radicals, resulting from the opening of the oxirane rings of epoxide compounds containing two, three or four epoxide groups in the molecule, $n^1$, $n^3$ and $n^5$ are from 0 to 3, $n^2$ and $n^4$ are from 1 to 3 and X is 0 or 1, and one or more of the divalent radicals $E^1$ in the general formula (II) may or may not be repaced by polyvalent radicals $E^2$.

The polyadducts according to the invention can be modified by reaction with aldehydes, monoepoxide compounds, carboxylic acids, carboxylic acid esters, isocyanates and/or blocked isocyanates or combined with crosslinking agents and used in a protonized form as binders for the cathodic electrocoating of metallic articles.

Suitable epoxide compounds for the preparation of the polyadducts according to the invention are those with 2, 3 or 4 epoxide groups per molecule, for example reaction products of polyhydric phenols, especially those of the formula

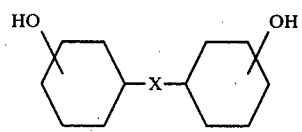

where X is $CH_2$,

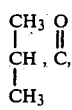

S, SO or SO$_2$, with epichlorohydrin. Other examples of phenols are bis-(4-hydroxytert.-butylphenyl)-2,2-propane, bis-(2-hydroxynaphthyl)-methane and 1,5-dihydroxynaphthalene or phenol adducts of cardanol (for example 3-pentadeca-8,11-dienyl)-phenol). However, the reaction products of polyhydric alcohols, e.g. ethylene glycol, diethylene glycol, propylene glycols, bis-(4-hydroxycyclohexyl)-2,2-propane, pentaerythritol, dipentaerythritol, trimethylolpropane, hexanetriol, glycerol or sorbitol, with epichlorohydrin may also be used. Other suitable epoxide compounds are epoxide oligobutadienes or polybutadienes or isoprene, as well as products which contain epoxidized cyclohexane radicals, epoxy resins obtained from 1,1-methylene-bis-(5-substituted)-hydantoin by the method of U.S. Pat. No. 3,891,097, diepoxides obtained from bis-imides by the method of U.S. Pat. No. 3,450,711, nitrogen-containing diepoxides obtained by the method of U.S. Pat. No. 3,365,471, 1,3,5-triglycidyl isocyanurate and epoxidized aminomethyldiphenyl oxides obtained by the method of U.S. Pat. No. 3,312,664.

Other suitable epoxy resins are the conventional products, containing blocked isocyanate groups, based on glycidyl ethers of bisphenol or of polyhydric alcohols.

The polyepoxide compounds are reacted with ammonia in a ratio corresponding to from 1.75 to 10 moles of ammonia per epoxide group. The range from 1.75 to 5 moles of ammonia per mole of epoxide group is particularly preferred if it is intended to prepare epoxide/ammonia adducts which are to be employed, without additional measures which substantially change the molecular weight, as binders for cathodic electrocoating.

The molecular weights of the polyadducts according to the invention are in general from 500 to 5,000, corresponding to amine numbers of from 30 to 275 mg of KOH/g of solids.

If a large or moderate excess of ammonia is used in the preparation of the polyadducts according to the invention, the products obtained contain exclusively primary amino groups, or primary and secondary amino groups, and their structures can be formally described by the general formula (I), where $n^3$ is 0.

If, in the preparation of the polyadducts according to the invention, $E^1$ is in part replaced by triepoxides or tetraepoxides, correspondingly branched products are obtained (cf. $E^2$ in general formula (II)).

Products branched via tertiary nitrogen can be obtained if the amount of ammonia employed is progressively reduced. Their structure can be represented by the general formula (I).

The products of high amine number, covered by (I), are particularly preferred for use, in a modified or non-modified and protonized form, in combination with conventional crosslinking agents, eg. amine-formaldehyde condensates, methylol phenol ethers and blocked polyisocyanates, in the presence or absence of external plasticers, for use as binders for cathodic electrocoating.

The reaction of ammonia with the epoxide compounds is in general carried out at from 20° to 100° C., preferably from 50° to 80° C., in pressure reactors, under pressures of, for example, from 3 to 20 bar. Advantageously, the reaction is carried out in the presence of a solvent, eg. an alcohol, ketone or glycol ether, or a higher-boiling solvent of this type which need not be removed after completion of the reaction.

If solvents are to be removed completely, they are in particular removed, together with residual ammonia, toward the end of the distillation, by applying reduced pressure.

The molecular weight resulting from the reaction of ammonia with the epoxide compounds depends not only on the ratio of ammonia to epoxide groups but also on the dilution at which the reaction is carried out; with increasing dilution, products of lower molecular weight are obtained.

In a further embodiment of the process, a proportion of the diepoxides is replaced by compounds containing three or four epoxide groups, these triepoxides or tetraepoxides being initially introduced into the ammonia-containing solvent, and the diepoxide then being added.

Since the novel polyadducts containing primary and secondary amino groups are alkanolamines, they can, for example, be reacted with formaldehyde to give the corresponding oxazolidine compounds. This can in particular be of advantage if the products are subsequently to be reacted with partially blocked polyisocyanates.

The novel polyadducts can also be reacted partially or completely with a monoepoxide, eg. ethylene oxide, propylene oxide or glycidol, and after complete reaction the product can be quaternized. This is also true of the products which are obtained with carboxylic acids, eg. fatty acids of 6 to 24 carbon atoms, or saturated or unsaturated carboxylic acid esters, eg. natural drying or semi-drying oils. The quaternization may be carried out by conventional methods, for example with alkyl halides or dialkyl sulfates, or with monoepoxides in the presence of acids.

A specific possible method of modifying the epoxide-ammonia adducts is to carry out an amide-forming reaction with saturated or ethylenically unsaturated carboxylic acids of 6 to 24 carbon atoms or, particularly simply, with carboxylic acid esters, giving the corresponding carboxylic acid amines. For this reaction, epoxide-ammonia adducts of comparatively high amine numbers, ie. products which have been prepared from polyepoxides or diepoxides of relatively high epoxide values, are particularly preferred.

This possible method of modification constitutes a method of internal plasticization of the resulting binder and is therefore in general only applied to the epoxide/ammonia adducts prepared from diphenols or polyphenols.

Dimeric fatty acids can be employed if the modifying reactions are to result in a quasi-doubling of the molecular weight.

A further specific method of modification is to carry out a reaction with glycidyl ethers of alkylphenols, where alkyl is saturated or unsaturated and of 6 to 18 carbon atoms, eg. nonylphenol or cardanol (which can essentially be regarded as 3-pentadeca-8,11-dienyl-phenol), or with monoglycidyl esters of saturated or unsaturated, linear or branched, carboxylic acids of 6 to 24 carbon atoms.

Finally, the polyadducts according to the invention may—if desired, in the form of their ketimine derivatives of ketones of 3 to 15 carbon atoms, eg. methyl isobutyl ketone or methyl ethyl ketone, or of their oxazolidine derivatives with aldehydes of 1 to 12 carbon atoms, eg. formaldehyde or isobutyraldehyde—also be reacted with isocyanates, or partially or completely blocked polyisocyanates, or vinyl isocyanate, eg. with toluylene diisocyanate, hexamethylene diisocyanate or isophorone diisocyanate, which is semiblocked with primary, secondary or tertiary alcohols, eg. n-, iso- or tert.-butanol, 2-ethylhexanol, oleyl alcohol, stearyl alcohol, isodecanol, ethylene glycol monoalkyl ethers of polyglycols, cyclohexanol, allyl alcohol, propargyl alcohol or a hydroxyalkyl acrylate. It is also possible to react the ethylenically unsaturated urethanes with dialkylaminoalkylamines. If completely blocked isocyanates are employed, it can be advantageous to use a mixture of two blocking agents. Polyisocyanates completely blocked with phenols or oximes are particularly reactive.

The various methods of modification can of course be combined with one another; for example, the novel polyadducts can be reacted with fatty acids, fatty acid esters and long-chain monoepoxides, and then be reacted further with a low molecular weight alkylene oxide.

Similar remarks apply to the ketimine derivatives of the novel polyadducts, which can, for example, subsequently be reacted with isocyanate groups.

The polyadducts according to the invention can also be subjected successively to several of the above modification reactions, provided what is occurring is clear, and provided the sequence of the reactions makes good chemical sense.

If the novel polyadducts, which may or may not be modified, are intended to be used in their protonized form as cathodic electrocoating binders, they can advantageously be combined with from 2 to 40% by weight of conventional crosslinking agents, such as amine/formaldehyde condensates, eg. melamine resins, benzoguanamine resins, urea-formaldehyde resins (eg. methylolated acetylenediurea derivatives), phenolic resins, methylol phenol ethers and completely blocked polyisocyanates.

If the above aminoplast or phenoplast resins are present, they can, after having been mixed with the novel polyadducts, be subjected to a precondensation with the latter.

The binders prepared using the novel polyadducts can be diluted with conventional surface-coating solvents, such as $C_3$–$C_{16}$-alcohols, eg. isopropanol, decanol, n-butanol and iso-butanol, alkyl-aromatics, eg. toluene, cycloaliphatics, (oligomeric) glycols and glycol ethers or aqueous organic solvent mixtures and then be applied, with or without pigments, fillers and conventional assistants, to the substrate to be coated or finished, eg. wood, metal, glass or ceramic, by conventional coating methods, eg. spraying, dipping or flooding; they are then dried and cured at above 150° C. The novel polyadducts can also be employed in combination with acrylate resins, containing blocked isocyanate groups, or similar crosslinkable binders for powder coating. The coatings obtained with such mixtures exhibit advantageous performance characteristics.

The novel products, as well as the carboxylic acid amide derivatives obtained by their modification, may also be employed as adduct hardeners for epoxy resins, especially for the glycidyl ethers of diphenols and polyphenols.

Preferably, however, the surface-coating binders prepared using the novel polyadducts are employed after protonization with acids, eg. phosphoric acid and its derivatives or, preferably, water-soluble carboxylic acids, eg. acetic acid, formic acid or lactic acid. The protonized surface-coating binder can be diluted with water and can be employed by the conventional surface-coating methods referred to above; coatings having very valuable properties are obtained in this case also.

The preferred use of the protonized surface-coating binders is the cathodic electrocoating of electrically conductive surfaces, for example of metal articles, sheets and the like made from brass, copper, aluminum, iron and steel, which may or may not have been chemically pre-treated, eg. phosphatized.

The aqueous solutions or dispersions of the surface-coating binders, which are, at least partially, in the form of a salt of a water-soluble carboxylic acid, can also contain, mixed therewith, additives which can be electrochemically deposited by cataphoresis, eg. pigments, soluble dyes, solvents, flow improvers, stabilizers, conventional hardening catalysts, eg. heavy metal compounds, anti-foam agents and other assistants and adjuvants.

The novel surface-coating binders may be employed both as the principal base resin for electrocoating or as the milling base for the pigment paste, or in combination with a conventional pigment paste (for example as described in German Laid-Open application DOS No. 2,606,831).

For cathodic electrocoating, the solids content of the electrocoating bath is in general brought to 5–30% by weight by dilution with demineralized water. The coating is in general carried out at from 15° to 40° C. for from 1 to 2 minutes at a pH of from 5.0 to 8.5, preferably from 6.0 to 8.0, at from 50 to 500 volt.

After rinsing off residual adhering bath liquor, the film which has been cathodically deposited on the electrically conductive article is hardened for from 10 to 30 minutes at from about 160° to 220° C., preferably for 20 minutes at from 170° to 180° C.

The novel coating agents, when cathodically deposited, give coatings with excellent mechanical properties, such as great hardness and scratch resistance, coupled with very good resilience and firm adhesion to the substrate.

In addition, the coatings obtained therewith are distinguished by high solvent resistance and corrosion resistance, for example in a salt spray test.

In addition to being useful in surface-coating binders, the novel polyadducts may also be employed as polymeric assistants, eg. as pigment binders in textile printing, as finishes, animalizing agents and dye-fixing agents for textiles, leather and paper, as protective colloids, as flocculants and retention agents in the manufacture of paper, and as assistants to facilitate the dyeing of human hair.

In the Examples, parts and percentages are by weight, unless stated otherwise.

EXAMPLE 1

Epoxide/ammonia adducts (a) Ratio

 $NH_3 = 1:4$ 813.0 parts of methanol and 184.0 parts of ammonia are introduced into a pressure kettle. 902 parts of a 60% strength solution, in toluene, of a diglycidyl ether obtained from bisphenol A and epichlorohydrin and having an epoxide value of 0.5, are introduced over 45 minutes, at 60° C., by means of a metering pump. The subsequent reaction is effected by heating the mixture at 70° C. for 4 hours. The maximum pressure during the reaction is 8 bar. The solvent and excess NH₃ are then removed by distillation, ultimately at 150° C./30 mm Hg. Examination of the clear, pale resin indicates a mean molecular weight of 2,300 and a Kofler softening point of 86° C. The total nitrogen content is 4.8%.. Of this, 2.9% are attributable to primary, 1.7% to secondary and 0.2% to tertiary amino groups.

(b) Ratio

 $NH_3 = 1:3$

If the reaction is carried out as described under (a), but with 138.0 parts of ammonia, a product having the followng data is obtained.

Mean molecular weight: 2,450; Kofler softening point 89° C. Total nitrogen 4.8%, of which 2.6% are attributable to primary amino groups, 1.9% to secondary amino groups and 0.3% to tertiary amino groups.

(c) Ratio

 $NH_3 = 1:2$

If the reaction is carried out as described under (a), but with 92.0 parts of ammonia, a product having the following data is obtained.

Mean molecular weight: 2,900; softening point 100° C. Total nitrogen 4.2%, of which 1.6% are attributable to primary amino groups, 2.1% to secondary amino groups and 0.5% to tertiary amino groups.

EXAMPLE 2

Epoxide-ammonia adducts (a) Ratio

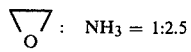 $NH_3 = 1:2.5$ 450.0 parts of methanol and 98 parts of ammonia are introduced into a pressure kettle. A mixture of 933.0 parts of a 60% strength solution, in toluene, of a diglycidyl ether obtained from bisphenol A and epichlorohydrin and having an epoxide value of 0.2, and 400 parts of a 60% strength solution, in toluene, of a diglycidyl ether of similar structure but having an epoxide value of 0.5, is introduced over 1½ hours at 60° C. by means of a metering pump. The mixture subsequently reacts for 4 hours at 70° C. The maximum pressure during the reaction is 7 bar. After removing the solvent and the excess ammonia, ultimately at 150° C./about 30 mm Hg, a clear, pale, solid resin having the following data is obtained:

Mean molecular weight: 2,680; softening point 122° C. Total nitrogen 2.7%, of which 1.2% are attributable to primary amino groups, 1.2% to secondary amino groups and 0.3% to tertiary amino groups.

(b) Ratio

 $NH_3 = 1:2.5$

If the reaction is carried out as described under (a) but first 993.0 parts and subsequently 400.0 parts of the two diglycidyl ether solutions are pumped in over 45 minutes each time, a resin having the following data is obtained.

Mean molecular weight: 3,150; softening point 114° C. Total nitrogen 2.7%, of which 1.3% are attributable to primary amino groups, 1.2% to secondary amino groups and 0.2% to tertiary amino groups.

EXAMPLE 3

Modification of an epoxide-ammonia adduct 35.5 parts of butylglycol are added to 200.0 parts of the epoxide/ammonia adduct described under Example 1c and the mixture is heated at 115° C. under nitrogen. 44.0 parts of glycidyl ether prepared from cardanal and epichlorohydrin (epoxide value 0.159) (Diluent C from Beck of India) are added dropwise to the melt over 30 minutes. The batch is then kept at about 120° C. until it has reached a constant viscosity (which requires about 1 hour 40 minutes). The amine number of the binder is 82 mg of KOH/g.

EXAMPLE 4

300.0 parts of the epoxide/ammonia adduct obtained as described in Example 1c and 40.0 parts of butylglycol are heated at 155°–160° C. 63.0 parts of linseed oil are added dropwise in the course of 1.5 hours, under N₂. After having reacted for about 3 hours at 160° C., the initially cloudy mixture becomes clear. The reaction is complete when the viscosity becomes constant, which requires about 3 more hours. The amine number of the batch is 73.5 mg of KOH/g.

The batch is diluted to 70% solids content with isopropanol in an apparatus equipped with an efficient stirrer. 35.0 parts of propylene oxide are then added dropwise over 45 minutes at 70° C. The reaction is complete when the gentle reflux has ceased.

EXAMPLE 5

Electrocoating (a) 80.0 parts of the binder referred to under Example 3 are mixed at 50° C. with 42.5 parts of a reactive melamine resin (®Luwipal 012, solids content 59%, from BASF AG), 5.0 parts of ®Disflammol DPK (phenol phosphoric acid ester) from Bayer AG, 5.0 parts of a C₁₃ monoalcohol mixture and 10.0 parts of isopropanol, protonized with 3.5 parts of acetic acid and slowly diluted to a solids content of 10% with fully demineralized water, whilst stirring thoroughly. The pH is 6.3; the conductivity is $1.35 \times 10^{-3} s.cm^{-1}$. Zinc-phosphatized steel panels are coated with the mixture at 100 V and 25° C. for 2 minutes. After baking for 20 minutes at 180° C., smooth coatings, about 15 μm thick, are obtained. A corrosion test according to DIN 50,021 gives values of 0.5 to 1.5 mm, measured from the cut, after 10 days duration, regardless of how often the test panels are after-treated with chromic acid or water.

(b) 87.0 parts of the binder employed under (a) are mixed, at 50° C., with 10.0 parts of a $C_{13}$ monoalcohol and 1.0 part of dibutyl-tin dilaurate and protonized with 3.9 parts of acetic acid; 49.0 parts of a 75% strength solution in toluene of a polyisocyanate, based on a reaction product of trimethylolpropane and an 80:20 toluylene diisocyanate isomer mixture, the polyisocyanate being completely blocked with cyclohexanol, are then added. The mixture is subsequently diluted to 10% solids content with fully demineralized water.

The pH is 6.1 and the conductivity $1.3 \times 10^{-3}$ s.cm$^{-1}$. Cathodic electrocoating, and the subsequent corrosion test, under the conditions described in (a), give similar results to (a).

EXAMPLE 6

300.0 parts of the epoxide/ammonia adduct obtained in Example 1c and 40.0 parts of butylglycol are heated at 155°–160° C., and 63.0 parts of linseed oil are added dropwise in the course of 1.5 hours, under $N_2$. After about 3 hours' reaction at 160° C., the initially cloudy mixture becomes clear. The reaction is complete when the viscosity has become constant, which requires about 3 hours longer. The amine number of the batch is 73.5 mg of KOH/g. Electrocoating:

77.5 parts of the binder, 10.0 parts of isopropanol, 5.0 parts of Disflamoll DPK from Bayer AG and 42.5 parts of a melamine resin, such as Luwipal 012 (59% strength) from BASF AG, are homogenized at 50°–60° C., protonized with 3.0 parts of acetic acid and slowly diluted to one liter with water. The solids content is 10%. The pH is 5.7 and the conductivity $1.2 \times 10^{-3}$ s.cm$^{-1}$.

Cathodic electrocoating is carried out at 350 volt and 25° C. for 2 minutes. After baking for 20 minutes at 180° C., smooth coatings 11–13 μm thick are obtained. A corrosion test according to DIN 50,021 on steel panels coated with iron phosphate and rinsed with water, gives values of from 1.5 to 3.0 mm, measured from the cut, after 10 days test duration.

We claim:

1. A process for modifying a polyadduct of ammonia in epoxide compounds, which consists of epoxide-free reaction products of ammonia and diepoxides, triepoxides and/or tetraepoxides, from 1.75 to 10 moles of ammonia having been employed per epoxide group and 1 mole of ammonia having been reacted with from 1.2 to 2.0 equivalents of epoxide, so that if diepoxide compounds are used products of the general formula (I)

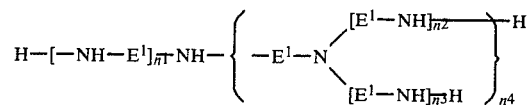

are obtained, while if triepoxides and/or tetraepoxide compounds are used, by themselves, or together with diepoxide compounds, products of the general formula II

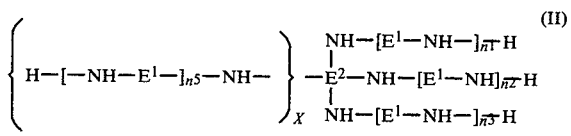

are produced; in these formulae, the $E^1$'s are identical or different hydroxyl-containing divalent radicals and the $E^2$'s are identical or different hydroxyl-containing trivalent or tetravalent radicals, resulting from the opening of the oxirane rings of epoxide compounds containing two, three or four epoxide groups in the molecule, $n^1$, $n^3$ and $n^5$ are from 0 to 3, $n^2$ and $n^4$ are from 1 to 3 and X is 0 or 1, and one or more of the divalent radicals $E^1$ in the general formula (II) may or may not be replaced by polyvalent radicals $E^2$, wherein the polyadduct is reacted with a monoepoxide compound, a carboxylic acid or a carboxylic acid ester.

2. A process for modifying the polyadduct as set forth in claim 1, wherein the polyadduct is at least partially protonized with an acid.

3. A process as set forth in claim 1, wherein from 2 to 40% by weight of a crosslinking agent from the group consisting of amine/formaldehyde condensates, phenol/formaldehyde condensates, methylol phenol ethers and blocked polyisocyanates to the modified polyadduct.

4. The process as set forth in claim 1 wherein a monoepoxide compound is reacted with the polyadduct.

* * * * *